United States Patent [19]

Sharma et al.

[11] Patent Number: 5,537,417
[45] Date of Patent: Jul. 16, 1996

[54] KERNEL SOCKET STRUCTURE FOR CONCURRENT MULTIPLE PROTOCOL ACCESS

[75] Inventors: Mohan B. Sharma; Yue Yeung; Chunhsiang Cheng, all of Austin, Tex.

[73] Assignee: International Business Machines Corporation, Armonk, N.Y.

[21] Appl. No.: 15,366

[22] Filed: Jan. 29, 1993

[51] Int. Cl.$^6$ .................................................... G06F 13/00
[52] U.S. Cl. ................................. 370/94.1; 395/200.02
[58] Field of Search ....................... 370/94.1, 60, 85.13, 370/85.14, 53, 58.1, 62, 79, 119, 94.2, 60.1; 364/284.4, 284, 200, 240.8, 280.9; 395/200, 700, 325, 500, 800; 375/121, 219, 220, 222, 225

[56] References Cited

U.S. PATENT DOCUMENTS

| | | | |
|---|---|---|---|
| 4,905,230 | 2/1990 | Madge et al. | 370/85.5 |
| 5,021,949 | 6/1991 | Morten et al. | 364/200 |
| 5,060,140 | 10/1991 | Brown et al. | 364/200 |
| 5,142,528 | 8/1992 | Kobayashi et al. | 370/79 |
| 5,142,622 | 8/1992 | Owens | 395/200 |
| 5,150,464 | 9/1992 | Sidhu et al. | 395/200 |
| 5,251,205 | 10/1993 | Callon et al. | 370/79 |

OTHER PUBLICATIONS

Vol. 10, No. 1. Feb. 1987, Guildford GB pp. 21–29. D. Coffield et al "Tutorial Guide To Unix Sockets For Network Communications".

IEEE Transactions on Software Engineering., vol. 17, No. 1, Jan. 1991, New York US pp. 64–76. N. C. Hutchinson et al "The X-Kernal: An Architecture For Implementing Network Protocols".

Vol. 27, No. 2, 1988, Armonk, New York US pp. 90–104, M. S. Kogan et al "The Design of Operating System/2".

Primary Examiner—Douglas W. Olms
Assistant Examiner—Ajit Patel
Attorney, Agent, or Firm—Jeffrey S. LaBaw

[57] ABSTRACT

In a multiprotocol environment, a new socket structure which moves the decision on which protocol to use until the time that the connection is actually made between nodes in the network. The new socket structure is created for every endpoint. All the protocols which could potentially be used to send or receive data is sent a request to create a protocol control block at the time the new socket is created. A selection process determines which of the protocols could be used by the endpoint. The new socket then contains information on each selected protocol. At the time a connection is established, any of the selected protocols could be used. The choice of which protocol to use can be based on user preferences, which protocols are available, the name of the service unit.

18 Claims, 6 Drawing Sheets

KERNEL SOCKET STRUCTURE FOR CONCURRENT MULTIPLE PROTOCOL ACCESS

BACKGROUND OF THE INVENTION

This invention relates generally to data communication in a network of computer systems. More particularly, it relates to a communication endpoint structure which enables application programs resident on systems to communicate through such a network irrespective of the protocol for which the application was written and the protocols available on the network.

Once upon a time, almost all computer systems were standalone processors to which private peripheral devices such as displays, printers and disk drives were connected, acting independently from any other computer system. Yet, it became apparent that there were substantial gains to be made if several computer systems could be cooperatively coupled together. Today, it has become commonplace to couple a multitude of computer systems into a distributed environment such as a local area or wide area network.

However, there are many vendors who have developed their own hardware and software solutions for integrating multiple computer systems. In particular, they have developed different ideas of the format and protocols that should be followed in transporting data through the networks. Some protocols support expedited data transmission by bypassing the standard data flow controls; others require all data to go through the controls. Specialized protocols are used for transport tasks such as establishing and terminating connections between computer systems. Examples of well known communication protocols include System Network Architecture (SNA), Digital Network Architecture (DECnet), Transmission Control Propotocol/Internet Protocol (TCP/IP), Network Basic Input/Output System (NetBIOS), Open Systems Interconnection (OSI) and AppleTalk. Other protocols are known and widely used.

Most distributed application programs are written to an application programming interface (API) which assumes a particular communications protocol. However, the distributed environments which most organizations have assembled are quite complex, comprised of confederations of individual networks running different communication protocols. If the transport protocols assumed by the distributed application's API and the transport protocols actually implemented in one or more of the networks on which the organization would like to send its data are not the same, the use of the application is limited. The problems of such heterogeneity in communications protocols is expected to get worse as more organizations begin to communicate with each other through their networks to perform order processing, direct billing or other cross organization activities.

While the distributed applications could be rewritten so that they can run over each transport protocol or application gateways can be written for each distributed set of distributed applications, the cost of having programmers write all the necessary code makes these approaches economically unattractive. A preferred solution is presented in commonly assigned patent, U.S. Pat. No. 5,224,098, entitled "Compensation for Mismatched Transport Protocols in a Data Communications Network", by R. F. Bird et al, filed Jul. 17, 1991 and hereby incorporated by reference. The incorporated patent teaches a transport connection layer between a first transport user at one node in the network and a second transport user at a different node in the network. When the transport protocol assumed by the application at the first node is not available in the network, the data being transferred between the two nodes is automatically altered to be compatible with the available transport protocols. Thus, an organization is able to choose application programs solely on the basis of the functions they provide, rather than the protocols which they require.

The above referenced application teaches a generalized transport layer. One of the transport structures which is presently used in the Berkeley version of the UNIX™ environment is called a socket. A socket is an object that identifies a communication endpoint in a network. A socket hides the protocol of the network architecture beneath from the application. A socket allows the association of an endpoint, such as an application program, with one of the selected protocols. This association occurs when the endpoint is created. An endpoint creation implies a static association of the socket with the protocol, which will remain invariant. However, in a multiprotocol environment, as described in the above referenced application, which facilitates heterogeneous connectivity, a transport endpoint may need to be bound to any of several available protocols after the creation of the endpoint. Therefore, if sockets are to be used in such an environment, a new socket structure which allows dynamic association of the socket with the protocol must be devised. The present invention teaches such a socket structure.

SUMMARY OF THE INVENTION

It is therefore an object of the present invention to facilitate late binding of an endpoint to a transport protocol in a distributed environment.

It is another object of the invention to allow native access to a protocol by an application.

It is another object of the invention to provide the necessary information for nonnative connections to a protocol.

These and other objects, features and advantages are accomplished by a new socket structure which moves the decision on which protocol to use to the time that the connection is actually made between nodes in the network. In a multiprotocol network, the new socket structure can be created for every endpoint. All of the protocols which could potentially be used to send or receive data are sent a request to create a protocol control block at the time the new socket is created. A selection process determines which of the protocols could potentially be used by a given endpoint. The new socket for the endpoint then contains information on each of the selected protocols. At the time a connection is established, any of the selected protocols could be used. Native or nonnative connections can be made. The choice of which protocol to use or the order of protocol preference can be based on user preferences through configuration, the local cache, or information from the named service unit.

BRIEF DESCRIPTION OF THE DRAWINGS

These features, objects and other advantages will be more clearly understood with reference to the attached drawings and following description.

DETAILED DESCRIPTION OF THE DRAWINGS

The following description describes a socket based architecture. However, the invention is not limited to sockets and could be applied to similar communication endpoint objects in other operating systems.

Although the following description contains an adequate disclosure of convention socket and network architecture to allow one skilled in the art to understand the present invention, the reader is referred to *The Design and Implementation of the 4.3 BSD UNIX Operating System* by S. J. Leffer et al., 1989 which is hereby incorporated by reference, for a more complete understanding of operating system based on the Berkley version of UNIX™. Such operating systems are well known.

Figure 1:
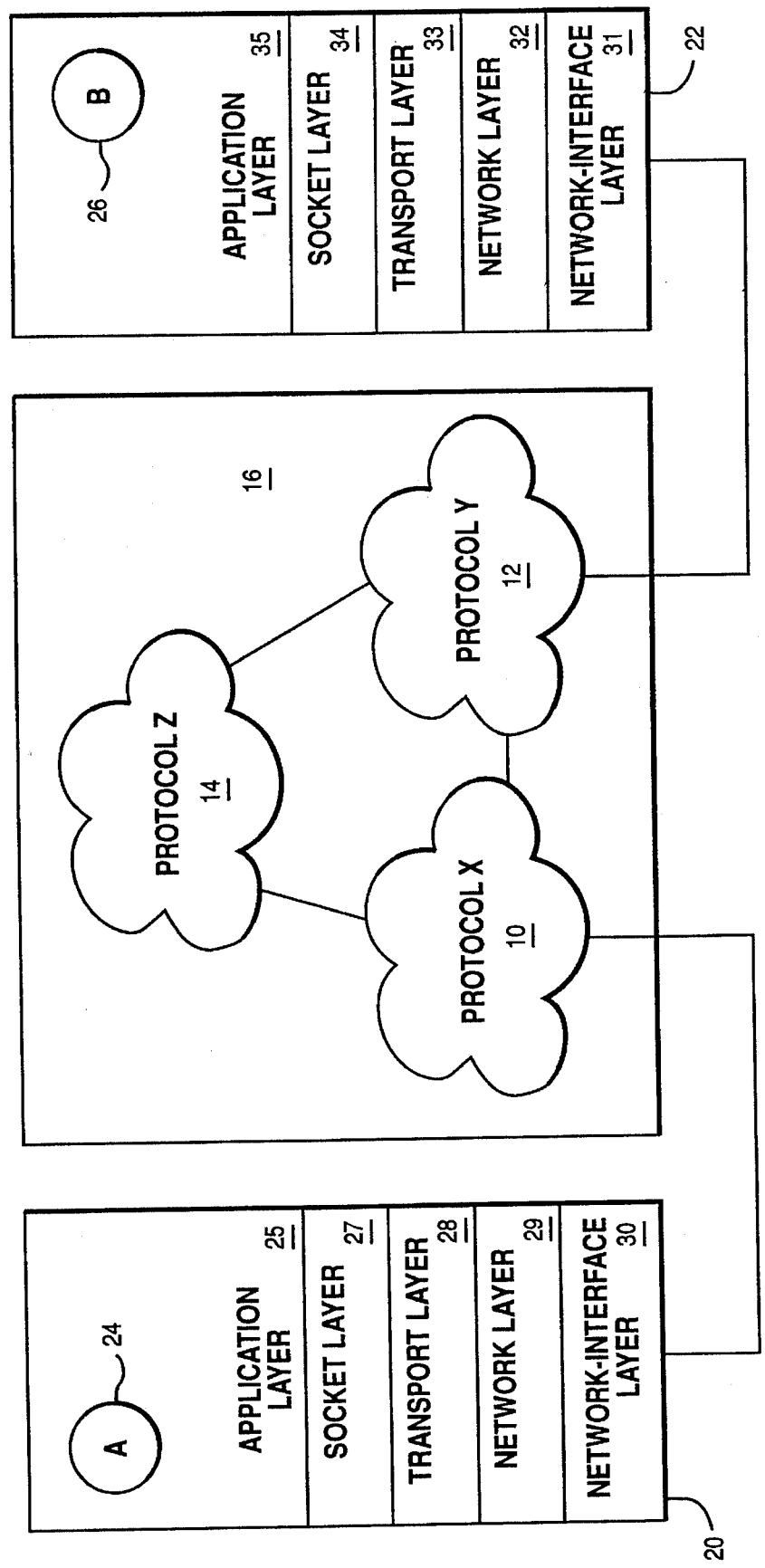
FIG. 1 is a diagram of two single protocol networks coupled together through a multiprotocol transport network.

FIG. 1 shows three single protocol networks 10, 12, 14 are interconnected through a gateway 59 built according to the principles of the present invention. With the growth of network distributed environments, it is not uncommon to see networks using four or five different protocols, such as TCP/IP, NetBIOS, SNA or AppleTALK. Since applications which run on one network will not often run with applications on the other, transport of data throughout the network is hindered. As discussed above, the MultiProtocol Transport Network (MPTN) 16 as taught in the above referenced patent addresses these problems by defining an interface and a compensation mechanism to a set of transport services that provide connections across a plurality of transport protocols. By providing a transport boundary between the networks and the applications resident on systems, MPTN provides a common transport interface so which messages from the applications can be transported over any protocol in the network.

As shown in FIG. 1, hosts 20 and 22 are coupled to the multiprotocol transport network 16. While the MPTN 16 appears as though it is a single logical network having a single protocol, host 20 is coupled to a first network 10 which communicates via protocol X, e.g., TCP/IP, and host 22 is coupled to a second network 12 which communicates via protocol Y, e.g., NetBIOS.

Application program A 24 resident in one of the hosts 20 coupled to the MPTN network 16 wishes to communicate to application B 26 resident in another host 22 also coupled to the network 16. Upon application As call to the socket layer 27, a socket is created by the socket layer 27 defining application A as an endpoint. Sockets contain information about their type, the supporting protocols used in the transport layer 28 and their state. A connection request goes through the transport layer 28, the network layer 29 and the network interface layer 30 which add the necessary control and data information before the message is sent out on the network 54. Compensation for the differences between protocol Q and X is carried out by the transport layer as taught by the above referenced patent application.

Figure 2:
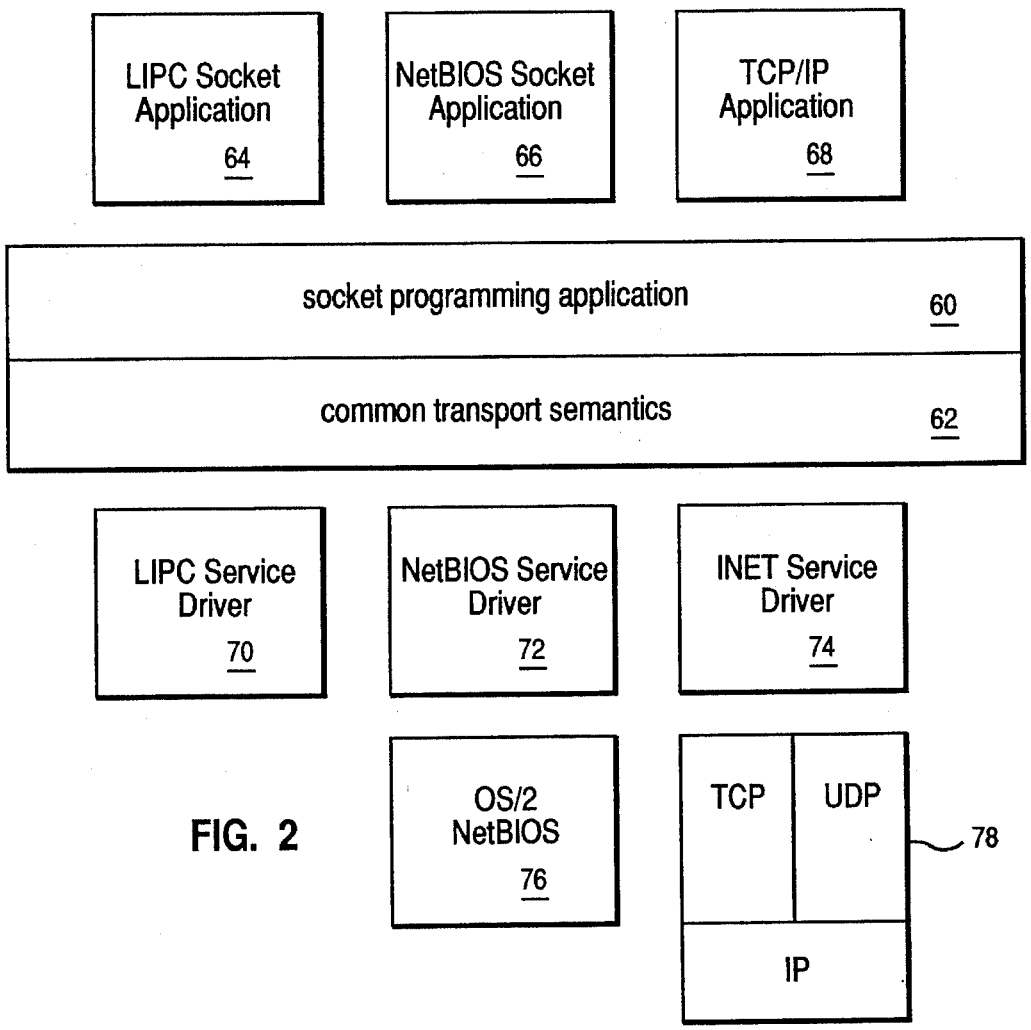
FIG. 2 is a block diagram of the transport interface used in the present invention.

FIG. 2 depicts the code modules in memory at a computer system which is coupled to the multiprotocol transport network in greater detail. The socket programming interface 60 and common transport semantics 62 correspond to the socket layer and separate the applications 64, 66, 68 from the service drivers 70, 72, 74. Three types of applications 64, 66, 68 are shown in the application layer. To utilize the socket structure of the present invention, NetBIOS applications would be rewritten to the socket API to become the NetBIOS socket application 66. The standard local IPC socket application 64 and TCP/IP applications 68 are already written to a standardized socket programming interface and so would require an minimum of revisions. The common transport semantics 62, include the socket control blocks, which will be described in greater detail below. An interface between the socket layer and the transport layer is comprised by the local IPC service driver 70, the NetBIOS service driver 72 and the INet service driver 74 which correspond to the applications in the application layer. The service drivers are used to emulate the common transport semantics for the transport protocol drivers in the transport layer. In the present invention, they may also contain the compensating means described in the above referenced application which converts a message intended for a first protocol by the application to a second protocol supported by the network. The transport layer includes the NetBIOS 76 and TCP/IP 78 protocol drivers which cause the application message to confirm to the protocol format. There is no corresponding local IPC module as it describes a local protocol whose messages are not placed on the network. The network and network interface layers are not pictured, the latter would include device drivers for the I/O hardware which couples the computer system to the network, e.g., a token ring or ethernet driver; the former might include drivers written to the well known NDIS interface.

A socket is the object in the Berkeley version of UNIX™ from which messages are sent and received. Sockets are created within a communication domain as files are created within a file system. A communication domain summarizes the sets of protocols, the naming conventions, the hardware which may be a particular network may use an address refers to the communication domain. The internet domain specified by the address family AF_INET; the NetBIOS domain is referenced by the address family AF_NETBIOS. A connection is a means by which the identity of the sending socket is not required to be sent with each packet of data. The identity of each communication endpoint is exchanged prior to any transmission of data and is maintained at the transmitting and receiving nodes, so that the distributed applications at each end can request the socket information at any time.

When an application creates a socket endpoint for a certain protocol and the protocol chosen by the transport network matches that protocol, native networking has occurred. For example, the INet protocol is used to support the INet address family and NetBIOS supports the NetBIOS address family. On the other hand, when the transport protocol does not match the socket endpoint of an application it is termed nonnative networking. Using the present invention, however, the application is unaware that a different transport protocol is being used to connect with other nodes in the network.

In the present invention, the socket interface is used to connect between replicas of a distributed application or the client and server portions of a client/server applications using a variety of transport protocols. The application can select the transport protocol or request that the socket layer determine the protocol. With the non-native networking feature of the present invention, applications written to communicate with one another using one protocol can chose to communicate on another transport protocol which might be optimized for the network environment. For example, an application written for TCP/IP could communicate the NetBIOS protocol over the network, thus, give the distributed application a significant performance gain.

Figure 3:
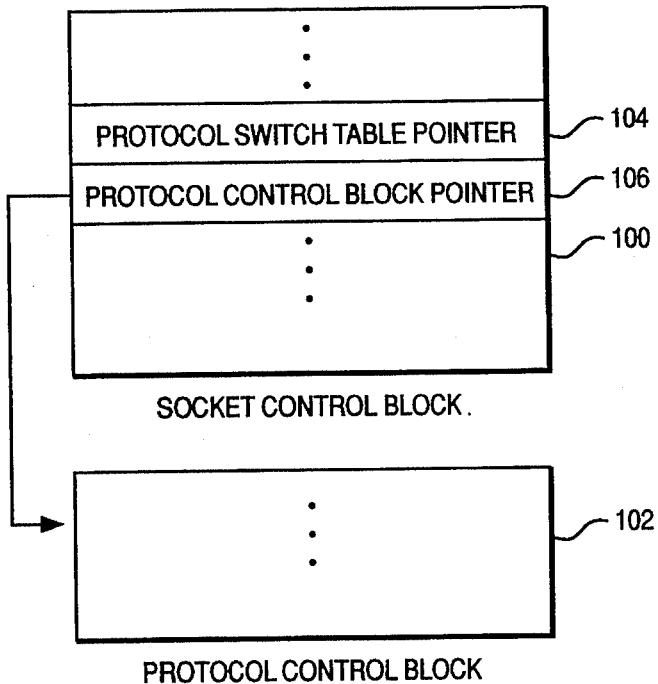
FIG. 3 is a diagram of a conventional socket control block.

A conventional socket control block is depicted in FIG. 3, a socket control block 100 contains information about the socket, including send and receive data queues, their type, the supporting protocol, their state and socket identifier. The socket control block 100 includes a protocol switch table pointer 104 and a protocol control block pointer 106. The pointers are used to locate the protocol switch table (not pictured) and the protocol control block 102 respectively. The protocol switch table contains protocol related information, such as entry points to protocol, characteristics of the protocol, certain aspects of its operation which are pertinent to the operation of the socket and so forth. The socket layer interacts with a protocol in the transport layer through the protocol switch table. The user request routine PR_USRREQ is the interface between a protocol and the socket. The protocol control block contains protocol specific information which is used by the protocol and is dependent upon the protocol.

Figure 4:
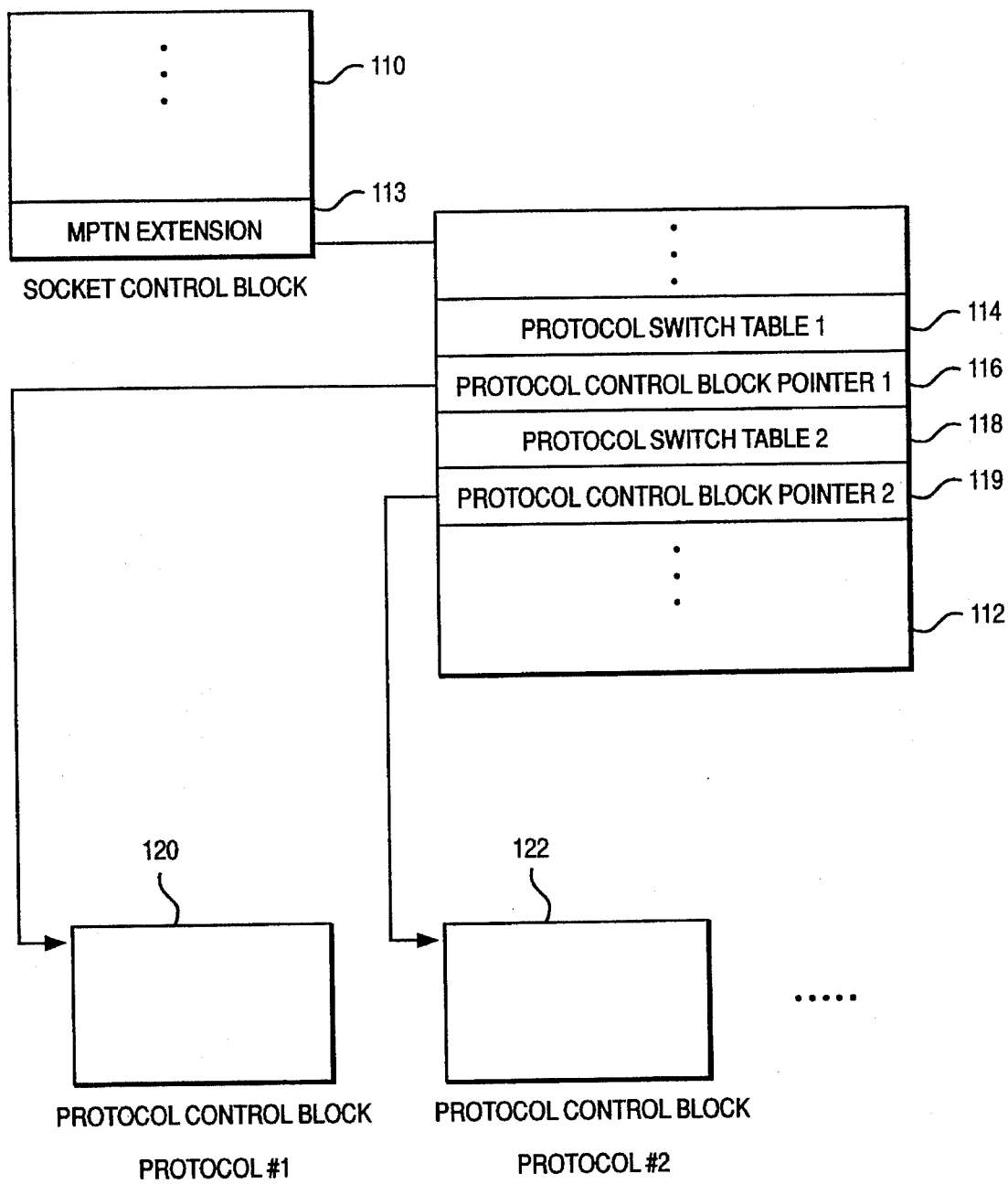
FIG. 4 is a diagram of the socket control block of the present invention.

A socket control block according to the present invention is shown in FIG. 4. Here, the socket control block 110 is shown broken into two sections, the main socket control block which is largely identical to the conventional socket control block above and the MPTN extension 112 which contains many of the features necessary for the present invention. Both are linked together by a multiprotocol transport network extension 113. Each of the protocols which could be potentially used to send or receive data is sent a request to create a protocol control block 120, 122 at the time the new socket is created. After a selection procedure, new socket then contains information regarding each selected protocol the protocol switch table pointer 114, 118, the protocol control block pointer 116, 119, and a pointer to a interface address if applicable for the particular protocol (not pictured). As above, the protocol switch table pointer refers to a respective protocol switch table which defines various entry points for that protocol. Also, the protocol control blocks 120, 122 contain protocol specific information.

At the time of socket creation, no connection is made to any particular protocol to the application endpoint. Connection implies an association of the connection-requestor socket of the requesting application to the connection-acceptor socket. It can be viewed as a communication wire running between the two sockets that are "connected", potentially in two different continents, providing the ability for both of them to send and receive messages. There is no difference between a transmitting socket and a receiving socket for the present invention. After a connection, each can send or receive data.

The decision on which protocol to use is delayed until the time that the connection is actually made. At the time of establishing a connection, any of the network interfaces in a protocol could be used. The order in which the pointers which refer to the protocols and network interfaces is based on user preference, information from the named service unit or the capability of the protocol. The socket extension 112 which contains the pointers 114, 116, 118 and 119, also includes state information on the socket and the multiprotocol transport network. The socket extension 112 is used by the socket layer to manage the socket and MPTN states. From the list of available protocols, the socket layer picks those protocols that support the requested socket domain and the type of communication (datagrams, streams, etc), as described in the flow diagram for socket creation described below.

A sample socket control block structure is given in the code below:

```
/* socketva.h.....
 * Kernel structure per socket.
 * Contains send and receive buffer queues,
 * handle on protocol and pointer to protocol
 * private data, error information and MPTN extensions.
 * The first part of this structure ( upto the so_mptn field ) is identical
 * to the BSD4.3 socket control block.
 */
struct socket {
    short      so_type;              /* generic type, see socket.h */
    short      so_options;           /* from socket call, see socket.h */
    short      so_linger;            /* time to linger while closing */
    short      so_state;             /* internal state flags SS_*, below */
    caddr_t    so_pcb;               /* protocol control block */
    struct     protosw far *so_proto;    /* protocol handle */
/*
 * Variables for connection queueing.
 * Socket where accepts occur is so_head in all subsidiary sockets.
 * If so_head is 0, socket is not related to an accept.
 * For head socket so_q0 queues partially completed connections.
 * while so_q is a queue of connections ready to be accepted.
 * If a connection is aborted and it has so_head set, then
 * it has to be pulled out of either so_q0 or so_q.
 * We allow connections to queue up based on current queue lengths
 * and limit on number of queued connections for this socket.
 */
    struct     socket far *so_head;  /* back pointer to accept socket */
    struct     socket far *so_q0;    /* queue of partial connections */
    struct     socket for *so_q;     /* queue of incoming connections */
    short      so_q0len;             /* partials on so_q0 */
    short      so_qlen;              /* number of connections on so_q */
    short      so_qlimit;            /* max number queued connections */
```

```
        short       so_timeo;           /* connection timeout */
        u_short     so_error;           /* error affecting connection */
        short       so_pgrp;            /* pgrp for signals */
        u_long      so_oobmark;         /* chars to oob mark */
/* Variables for socket buffering.
 */
        struct      sockbuf {
                    u_long  sb_cc;      /* actual chars in buffer */
                    u_long  sb_hiwat;   /* max actual char count */
                    u_long  sb_mbcnt;   /* chars of mbufs used */
                    u_long  sb_mbmax;   /* max chars of mbufs to use */
                    u_long  sb_lowat;   /* low water mark (not used yet) */
                    struct  mbuf far *sb_mb;  /* the mbuf chain */
                    struct  proc far *sb_sel; /* process selecting read/write */
                    short   sb_timeo;   /* timeout (not used yet) */
                    short   sb_flags;   /* flags, see below */
        } so_rcv, so_snd;
    /* MPTN SOCKET EXTENSION */
        struct m_esock far * so_mptn;   /* socket MPTN extensions */
#define SB_MAX      ((u_long)(64*1024L))    /* max chars in sockbuf */
#define SB_LOCK             0x01        /* lock on data queue (so_rcv only ) */
#define SB_WANT             0x02        /* someone is waiting to lock */
#define SB_WAIT             0x04        /* someone is waiting for data/space */
#define SB_SEL              0x08        /* buffer is selected */
#define SB_COLL             0x10        /* collision selecting */
};
  /* Socket extension for MPTN
   * The socket control block points to this structure which contains
   * all the MPTN related socket extensions.
   * Since m_esock, the MPTN extensions to sockets, is contained in one
   * mbuf, we could use the rest of mbuf space to accommodate the pcb
   * pointers.
   */
  /* defines the structure for storing additional pointers.
   * used in m_esock.
   * The structure m_addr defines the address format.It is defined in mptndef.h.
   * The structure m_info defines the user specified connection characteristics
   * and is defined in mptndef.h.
   * The structure bnlst defines the user configured protocol preference list
   * and is defined in mptndef.h.
   *
   */
  struct m_sopcb {
            struct protosw far * so_proto;    /* protocol switch ptr */
            caddr_t so_pcb;                   /* pointer to the PCB */
            struct m_addr far * so_bnsap;     /* the network interface     that
                                               * the PCB refers to */
                    };
  struct m_conn_stat {
        char        type;       /* DST_BNSAP_FOUND,USE_PREF_LIST,CACHE.
                                 * GW_NEXT_HOP, GW_BNSAP */
        char        index;      /* current network...as an index in to the
                                 * pref. list as the case is.
                                 */
        caddr_t     ftnam;      /* destination name..for ABM case, Gateway
                                 * cases, it is dst_b_nam.
                                 * In the native case or cache case,contains
                                 * the dest A-addr
                                 */
        struct bnlst far *prflst; /* pointer to the pref list */
                    };
  struct m_esock {
    int (* so_upcall ) ( );             /* user upcall address */
    struct socket far * so_relay;       /* relay socket pointer:for gateway only */
        struct m_info far * so_info;    /* connection chars given at m_create( )*/
        struct m_info far * so_cinfo;   /* conn.char of a connection */
        short so_domain;                /* user specified domain */
        struct m_addr far * so_lanam;   /* local user name */
        struct m_addr far * so_panam;   /* peer user name */
        struct mbuf far * so_ctdata;    /* connection/termination data */
        struct mbuf far * so_expdat;    /* expedited data */
        struct socket far * so_next;    /* linked list of nonnative scbs.to search
                                         * for user-names*/
        unsigned so_mptn_flag;          /* mptn flags having the following defs*/
        struct m_conn_stat conn_stat;   /* to maintain mptn_connect status */
        short so_pcbnum ;               /* number of pcbs currently in sopcb[ ] */
        long so_pcbstat;                /* pcb state:bit position corresponds to
                                         * pcb array; 0=>in-use; else not-in-use*/
        struct m_sopcb sopcb [MPTN_MAXPCB];/* array of m_sopcb structures */
#define MPTN_NONNATIVE                  0x01    /* indicates nonnative connection */
```

```
#define MPTN_NATIVE              0x02    /* indicates native connection */
#define MPTN_SO_BIND             0x04    /* sock mptn state=>addr bound */
#define MPTN_SO_UNBIND           0x08    /* sock mptn state=>addr not bound*/
#define MPTN_SO_CONN             0x10    /* sock mptn state=>connect req is made*/
#define MPTN_SO_NOMORE_CONN      0x20    /* =>there will be no more conn. re-try
                                          * over other networks/protocols*/ define MPTN_SO_LISTEN           0x40    /* init state of a passive sock */
define MPTN_SO_CON_HEAD_WAIT    0x80    /* native con set up..waiting for MPTN
                                          * connect header   */ define MPTN_SO_CON_HEAD_RCVD    0x0100  /* passive node...mptn con rcvd..*/
define MPTN_SO_CON_HEAD_SENT    0x0200  /* Active node...mptn con sent ..*/
#define MPTN_SO_CON_ESTABLISHED  0x0400  /* Connection established ...*/
#define MPTN_SO_CLOSED           0x0800  /* local socket close issued */
#define MPTN_SO_BCAST_RCV        0x1000  /* the socket is enabled to rcv
                                          * broadcast dgms.*/ define MPTN_SO_IN_ADDR_ANY      0x2000  /* the socket is bound to in_addr_any */
};
/*
 * Socket state bits.
 */
#define SS_NORDREF         0x001   /* no file table ref any more */
#define SS_ISCONNECTED     0x002   /* socket connected to a peer */
#define SS_ISCONNECTING    0x004   /* in process of connecting to peer */
#define SS_ISDISCONNECTING 0x008   /* in process of disconnecting */
#define SS_CANTSENDMORE    0x010   /* can't send more data to peer */
#define SS_CANTRCVMORE     0x020   /* can't receive more data from peer */
#define SS_RCVATMARK       0x040   /* at mark on input */
#define SS_PRIV            0x080   /* privileged for broadcast, raw... */
#define SS_NBIO            0x100   /* non-blocking ops */
#define SS_ASYNC           0x200   /* async i/o notify */
#define SS_CANCEL          0x4000  /* cancel call */
#define SS_PUSHSEEN        0x8000  /* seen push   */
/* Rest of the info is the same as in the BSD4.3 socketva.h */
Copyright, IBM Corp. 1993
```

Conventional socket creation starts with a call to the socket API. A domain table is searched for the address family, the type and protocol which is desired by the application. If a match is found tile protocol switch table entry is set in the socket control block. Next, the user requests entry and the selected protocol is called to create the protocol control block. If a match is not found in the domain table for the address family, type and protocol desired by the application, an error is returned to the application.

Figure 5:
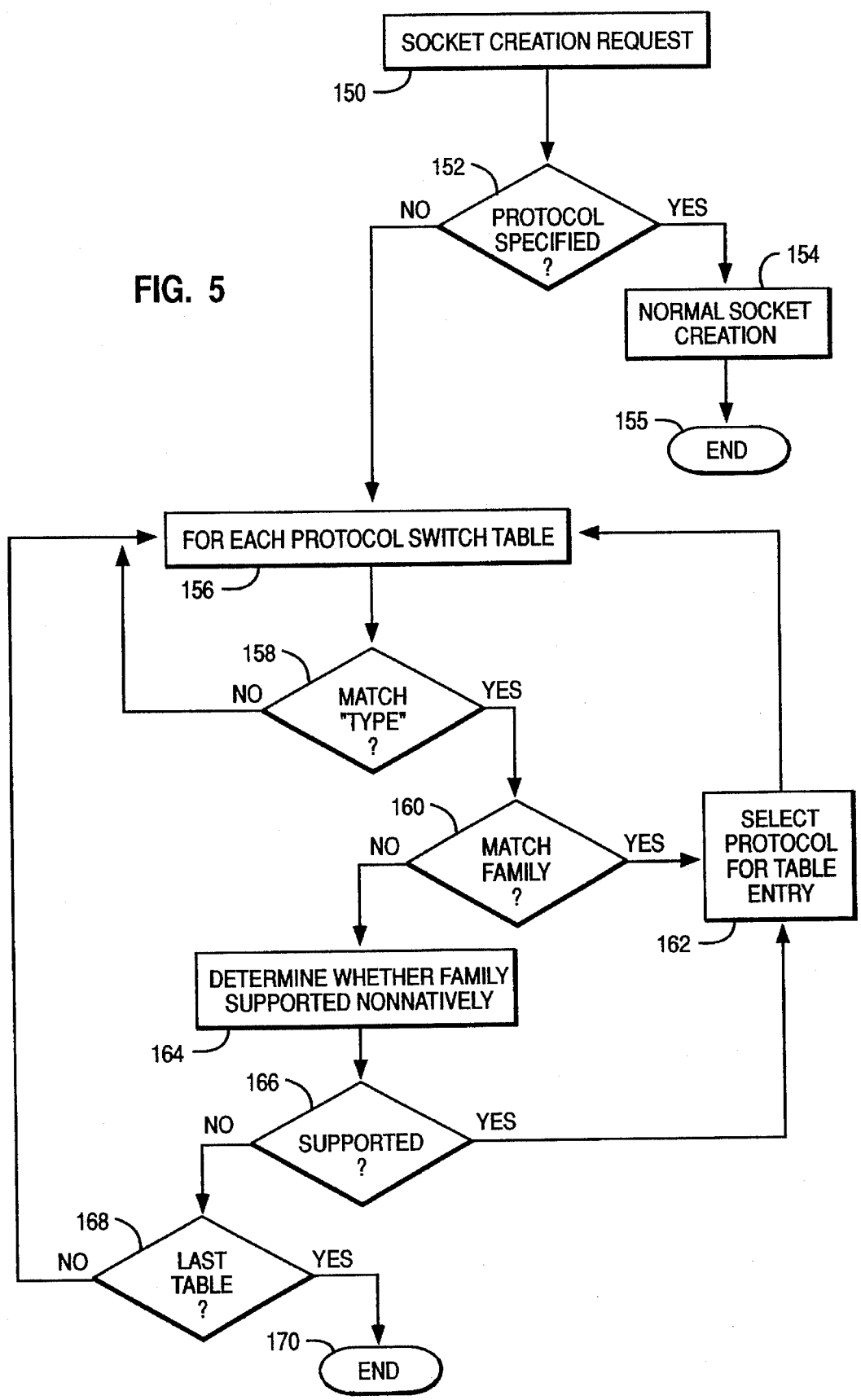
FIG. 5 is a flow diagram of the creation of the socket of the present invention.

FIG. 5 depicts the process of creating a socket according to the present invention. The process begins with a socket creation request 150 from an application to the socket API, the application wishes to send or receive data across the network. The command to the socket API for the request takes the form of socket=(AF, *, type, proto). "AF" refers to the address family and communication domain; "type" refers to one of the socket types defined in a system header file. The "proto" or protocol parameter is used to indicate that a specific protocol is to be used. A test is performed in step 152 to determine if "proto" is specified. If so, the normal socket creation process in step 154 is carried out and the process ends, step 155.

If "proto" is not specified, the process continues to create a multiprotocol socket. Each protocol is associated with a protocol switch table. For each protocol switch table, step 155, tests are performed whether the type and address family of the requesting endpoint, steps 158 and 160, are matched by the protocol. In step 158 the test for "type" match is performed. If the test fails, the process returns for the next protocol switch table, step 156. If the test succeeds, the test for address family match is performed in step 160. Both the "type" and "family" are represented as integers. By matching, the socket layer compares the 'type' and "address family" field supplied by the user and the "type" and "address family" fields in the protocol. If a match is found for both type and address family, the protocol is selected as a candidate protocol and set in the socket extension with pointers to the protocol switch table and protocol control block, step 162. If there is no match, the process determines whether the address family is supported non-natively in the network, step 164. If the protocol is supported, step 166, the protocol is selected as a candidate protocol and set in the socket extension with pointers to the protocol switch table and protocol control block, step 162. If the protocol is not supported, in step 166, a test is performed to determine whether it is the last protocol switch table. If not, the process returns to step 156. If it is the last protocol switch table, the process ends, step 170. The protocol pointers can be reordered within the extension according to the application or user preference through the use of a configuration tool or according to information from the named server.

Figure 6:
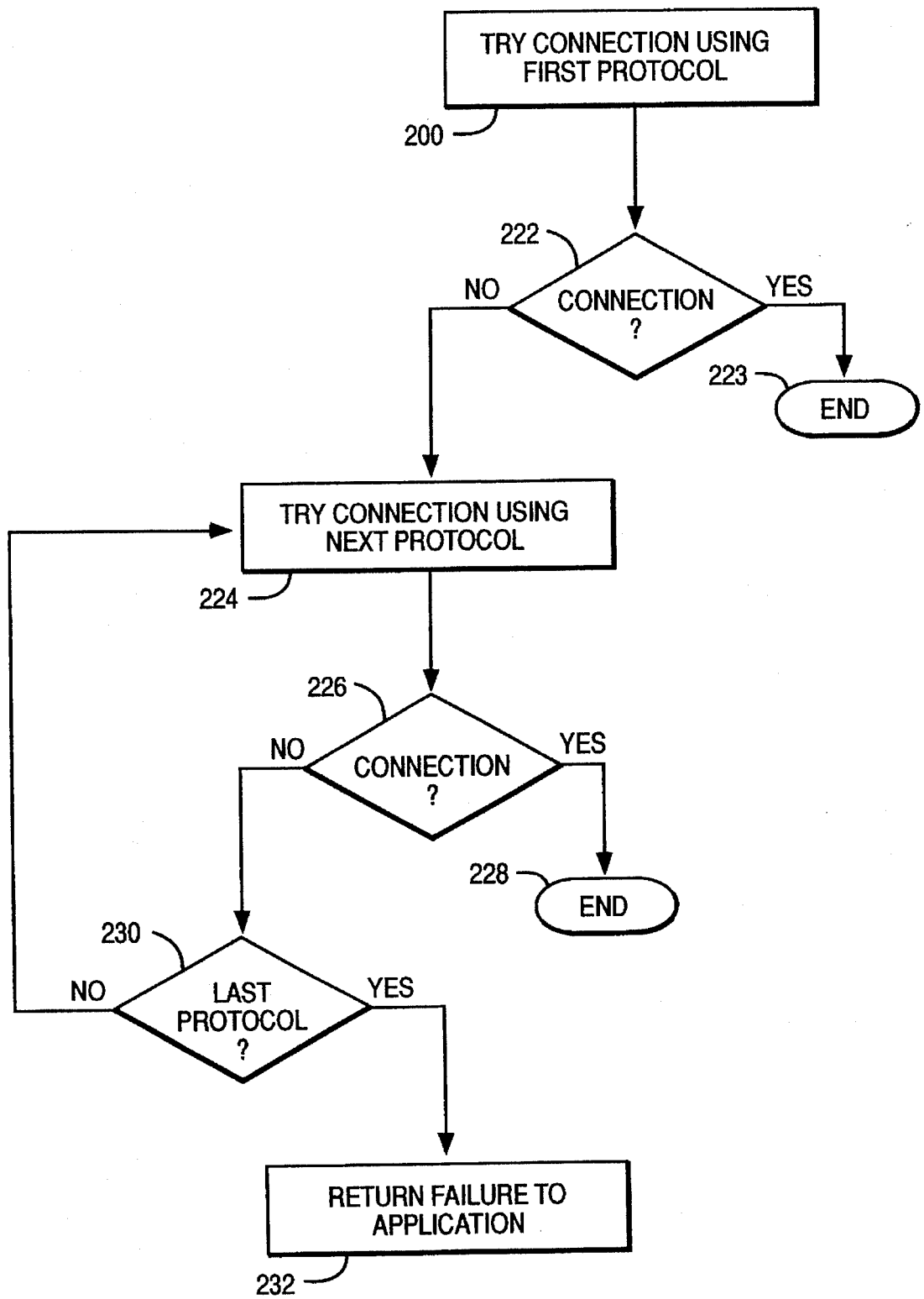
FIG. 6 is a flow diagram of establishing a connection in a multiprotocol transport network environment.

In FIG. 6, the process to establish a connection using the multiprotocol socket is described. The process begins in step 200 where the socket layer tries connecting to a specified destination using the first protocol from the list of protocols in the socket extension. The choice of which of the protocols to try first can be based on the configuration of user specified preference order of protocols. If the connection succeeds, step 222, the process ends in step 223. If not, the next protocol is used to try to establish a connection in step 224. Tests are performed determine whether a connection is made, step 226. If so, the process ends. If a connection is not made, a test is performed to determine whether it is the last protocol in the socket extension. If not, the next protocol in the extension is tested, step 224. If all the protocols used when creating the socket have failed to provide the connection, the transport provider returns a notification of failure to the application, step 232.

As mentioned previously, the invention finds use in a plurality of computers which are part of a network such as a Local Area Network or wide Area Network. Although the specific choice of computer in these networks is limited only by performance and storage requirements, computers in the IBM PS/2 (TM) series of computers could be used in the present invention. For additional information on IBM's PS/2 series of computers, the reader is referred to *Technical Reference Manual Personal* Systems/2 Model 50, 60 Systems IBM Corporation, Part No. 68X2224 Order Number S68X-2224 and *Technical Reference Manual Personal Systems/2 (Model 80) IBM Corporation* Part No. 68X 2256 Order Number S68X-2254. One operating system which an IBM PS/2 personal computer may run is IBM's OS/2 2.0 (TM). For more information on the IBM OS/2 2.0 Operating System, the reader is referred to *OS/2 2.0 Technical Library. Programming guide Vol.* 1, 2, 3 *Version* 2.00 Order Nos. 10G6261, 10G6495, 10G6494. In the alternative, the computer system might be in the IBM RISC System/6000 (TM) line of computers which run on the AIX (TM) operating system. The various models of the RISC System/6000 are described in many publications of the IBM Corporation, for example, *RISC System/6000, 7073 and 7016 POWERstation and POWERserver Hardware Technical* reference, Order No. SA23-2644-00. The AIX operating system is described in *General Concepts and Procedure—AIX Version 3 for RISC System/6000* Order No. SC23-2202-00 as well as other publications of the IBM Corporation. In lieu of the cited references, the reader is offered the following general description of a computer system which could be utilized to practice the present invention.

Figure 7:
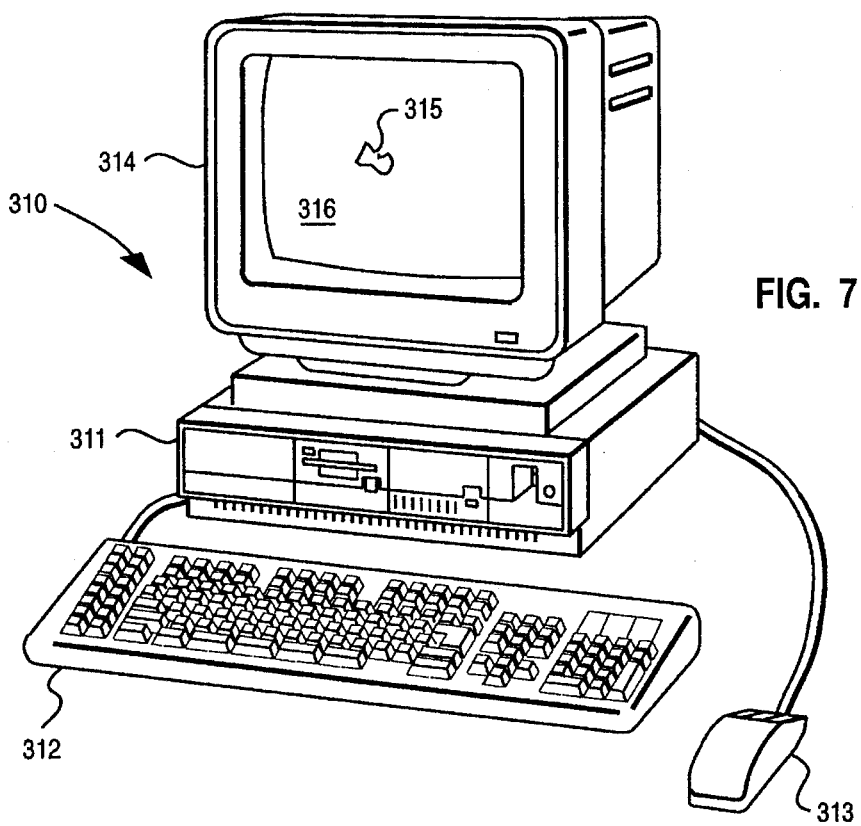
FIG. 7 is a presentation of a computer system including system unit, keyboard, mouse and display.

In FIG. 7, a computer 310, comprising a system unit 311, a keyboard 312, a mouse 313 and a display 314 are depicted. The screen 316 of display device 314 is used to present the visual changes to the data object. The graphical user interface supported by the operating system allows the user to use a point and shoot method of input by moving the pointer 315 to an icon representing a data object at a particular location on the screen 316 and press one of the mouse buttons to perform a user command or selection.

Figure 8:
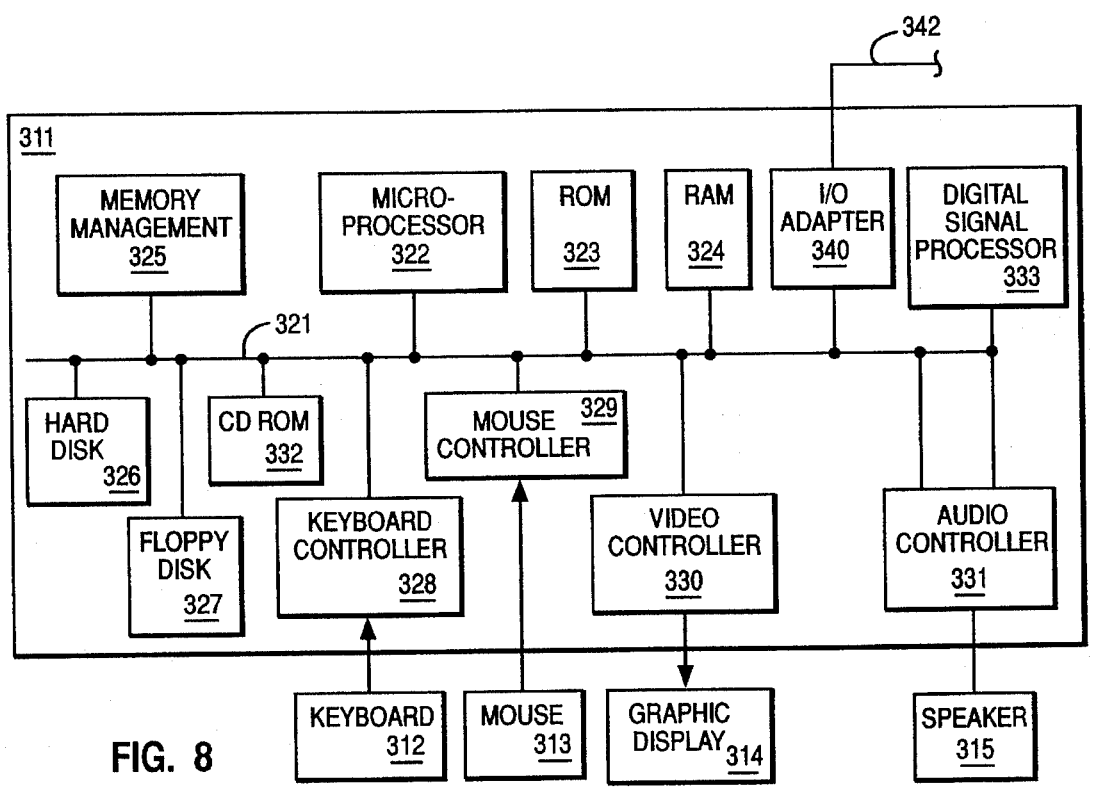
FIG. 8 is a block diagram of the computer system components depicted in FIG. 7.

FIG. 8 shows a block diagram of the components of the computer shown in FIG. 7. The system unit 11 includes a system bus or plurality of system buses 21 to which various components are coupled and by which communication between the various components is accomplished. The microprocessor 322 is connected to the system bus 321 and is supported by read only memory (ROM) 323 and random access memory (RAM) 324 also connected to system bus 321. A microprocessor in the IBM multimedia PS/2 series of computers is one of the Intel family of microprocessors including the 386 or 486 microprocessors. However, other microprocessors included, but not limited to, Motorola's family of microprocessors such as the 68000, 68020 or the 68030 microprocessors and various Reduced Instruction Set Computer (RISC) microprocessors manufactured by IBM, Hewlett Packard, Sun, Intel, Motorola and others may be used in the specific computer.

The ROM 323 contains among other code the Basic Input-Output system (BIOS) which controls basic hardware operations such as the interaction and the disk drives and the keyboard. The RAM 324 is the main memory into which the operating system, transport providers and application programs are loaded. The memory management chip 325 is connected to the system bus 321 and controls direct memory access operations including, passing data between the RAM 324 and hard disk drive 326 and floppy disk drive 327. The CD ROM 332 is also coupled to the system bus 321.

Also connected to the system bus 321 are various I/O controllers: The keyboard controller 328, the mouse controller 329, the video controller 330, and the audio controller 331 which control their respective hardware, the keyboard 312, the mouse 313, the display 314 and the speaker 315. Also coupled to the system bus 321 is the digital signal processor 333 which corrects the sound produced by the speaker 315 and is preferably incorporated into the audio controller 331. An I/O controller 340 such as a Token Ring Adapter enables communication over a network 342 to other similarly configured data processing systems.

While the invention has been described with respect to particular embodiments above, it will be understood by those skilled in the art that modifications may be made without departing from tile spirit and scope of the present invention. The preceding description has described the principles of the present invention in terms of a particular communications endpoint object, a socket, in the socket layer between the application layer and transport layer. The principles of the invention could be extended to provide similarly configured communication endpoint objects in other layers. For example, an object in tile network interface layer could be used to monitor a plurality of underlaying MAC drivers to that data could be sent or received over a plurality of MAC protocols to different types of networks. These embodiments are for purposes of example and illustration only and are not to be taken to limit the scope of the invention narrower than the scope of the appended claims.

We claim:

1. A method for communicating between nodes in a network in which a plurality of protocols are used, comprising the steps of:

prior to establishing communication between a first and a second node, creating a socket structure in the first node, the socket structure having information about and pointers to access a plurality of protocol blocks, each protocol block written to a respective one of the plurality of protocols, wherein the creating step comprises the steps of:

requesting information about each of the plurality of protocols;

selecting a set of protocols from the plurality of protocols;

building the protocol control block for each of the selected set of protocols; and, storing a pointer in the socket structure to each protocol control block for a respective one of the selected set of protocols; and at the time communication is requested between the first and second nodes, selecting one of the plurality of protocol blocks to establish a connection between the first and second nodes.

2. The method as recited in claim 1 wherein the creating step further comprises the step of creating a list of protocols ordered according to user preferences and the selecting step comprises the step of attempting to establish the connection by successively using the protocols in their order in the list until the connection is successfully established.

3. The method as recited in claim 2 wherein the plurality of protocols are chosen based on a capability of the protocols to support a requested socket domain and a type of communication.

4. The method as recited in claim 1 wherein the pointers are ordered in the socket structure based on user preference.

5. The method as recited in claim 1 wherein the selecting step comprises the steps of:

determining whether a first protocol matches a protocol for which a requesting application was written; and, responsive to finding no match for the first protocol, determining whether the first protocol is supported nonnatively in the network.

6. A system for communicating between nodes in a network in which a plurality of protocols are used comprising:

means for creating a socket structure prior to communication between a first and second computer system, the socket structure having information about and pointers to access a plurality of protocol blocks, each protocol block written to a respective one of the plurality of protocols, the creating means in the first and second computer system each coupled to nodes in the network;

means for requesting information about each of the plurality of protocols;

means for selecting a set of protocols from the plurality of protocols;

means for building the protocol control block for each of the selected set of protocols;

means for storing a pointer in the socket structure to each protocol control block for a respective one of the selected set of protocols; and, means for selecting one of the plurality of protocol blocks at the time communication is requested to establish a connection between the first and second computer systems.

7. The system as recited in claim 6 wherein the creating means further comprises means for creating a list of protocols ordered according to user preferences and the selecting means comprises means for attempting to establish the connection by successively using the protocols in their order in the list until the connection is successfully established.

8. The system as recited in claim 7 wherein the plurality of protocols are chosen based on a capability of the the protocols to support a requested socket domain and a type of communication.

9. The system as recited in claim 6 wherein the pointers are ordered in the socket structure based on user preference.

10. The system as recited in claim 6 which further comprises:

means for determining whether a first protocol matches a protocol for which a requesting application was written; and, means for determining whether the first protocol is supported nonnatively in the network responsive to finding no match for the first protocol.

11. The system as recited in claim 6 further comprising:

a network; and a plurality of computer systems coupled to the network.

12. A computer program product for communicating between nodes in a network in which a plurality of protocols are used, the product on a computer readable medium comprising:

means for creating a socket structure prior to communication between a first and second computer system, the socket structure having information about and pointers to access a plurality of protocol blocks, each protocol block written to a respective one of the plurality of protocols in the first and second computer system each coupled to nodes in the network;

means for requesting information about each of the plurality of protocols:

means for selecting a set of protocols from the plurality of protocols;

means for building the protocol control block for each of the selected set of protocols;

means for inserting a pointer in the socket structure to each protocol control block for a respective one of the selected set of protocols; and, means for selecting one of the plurality of protocol blocks at the time communication is requested to establish a connection between the first and second computer systems.

13. The product as recited in claim 12 wherein the creating means further comprises means for creating a list of protocols ordered according to user preferences.

14. The product as recited in claim 13 wherein the plurality of protocols are chosen based on a capability of the selected protocol to support a requested socket domain and a type of communication.

15. The product as recited in claim 12 wherein the pointers are ordered in the socket structure based on user preference.

16. The product as recited in claim 12 which further comprises:

means for determining whether a first protocol matches a protocol for which a requesting application is written; and, means for determining whether the first protocol is supported nonnatively in the network responsive to finding no match for the first protocol.

17. A method for communicating between nodes in a network in which a plurality of protocols are used, comprising the steps of:

prior to establishing communication between a first and a second node, creating a socket structure in the first node, the socket structure having information about and pointers to access a plurality of protocol blocks, each protocol block written to a respective one of the plurality of protocols;

at the time communication is requested between the first and second nodes, selecting one of the plurality of protocol blocks to establish a connection between the first and second nodes; and selecting another one of the plurality of protocol blocks to establish a connection between the first node and a third node at the time of communication is requested between the first and third nodes so that concurrent communication through the socket structure is accomplished using a first and a second protocol between the first and second nodes and the first and third nodes respectively.

18. A system for communicating between nodes in a network in which a plurality of protocols are used comprising:

means for creating a socket structure prior to communication between a first and second computer system, the socket structure having information about and pointers to access a plurality of protocol blocks, each protocol block written to a respective one of the plurality of protocols, the creating means in the first and second computer system each coupled to nodes in the network;

means for selecting one of the plurality of protocol blocks at the time communication is requested to establish a connection between the first and second computer system; and means for selecting another one of the plurality of protocol blocks to establish a connection between the first node and a third node at the time of communication is requested between the first and third nodes so that concurrent communication through the socket structure is accomplished using a first and a second protocol between the first and second nodes and the first and third nodes respectively.

* * * * *